M. WORKSMAN.
DELIVERY VEHICLE.
APPLICATION FILED MAR. 14, 1914.
1,146,296.
Patented July 13, 1915.
2 SHEETS—SHEET 1.
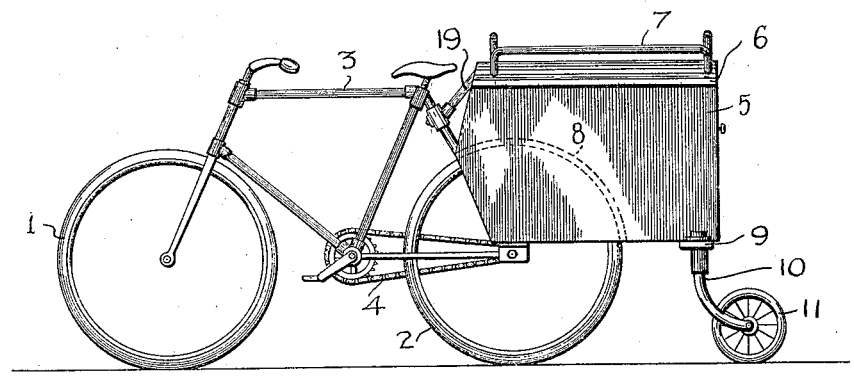
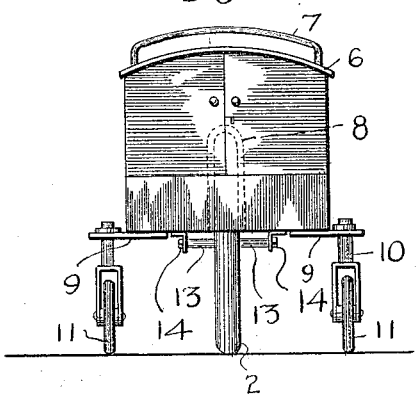
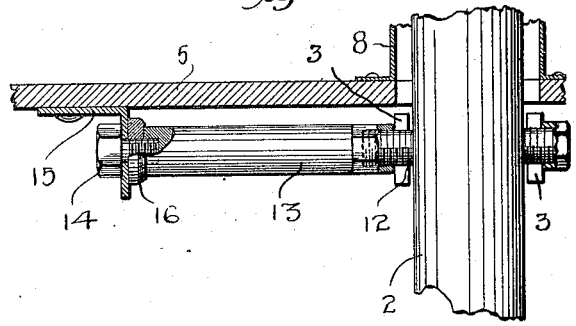
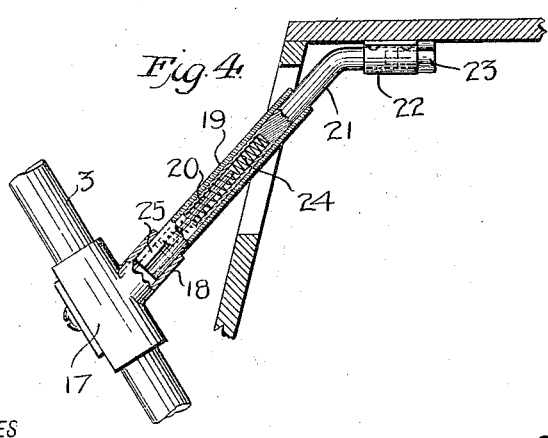
WITNESSES
INVENTOR
Morris Worksman
BY
ATTORNEYS

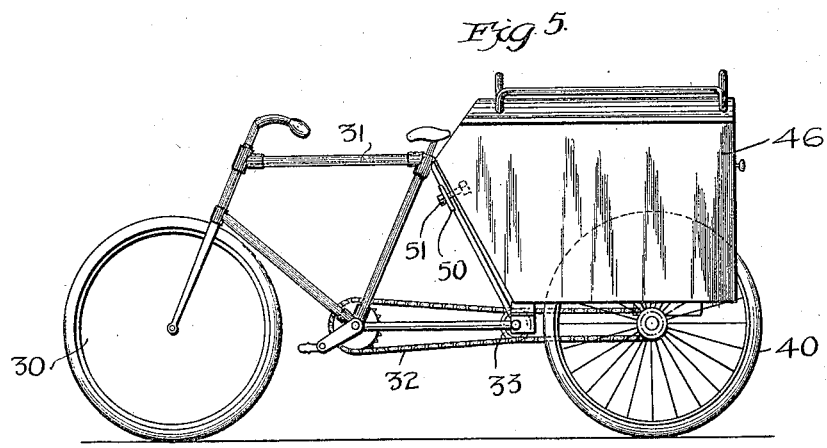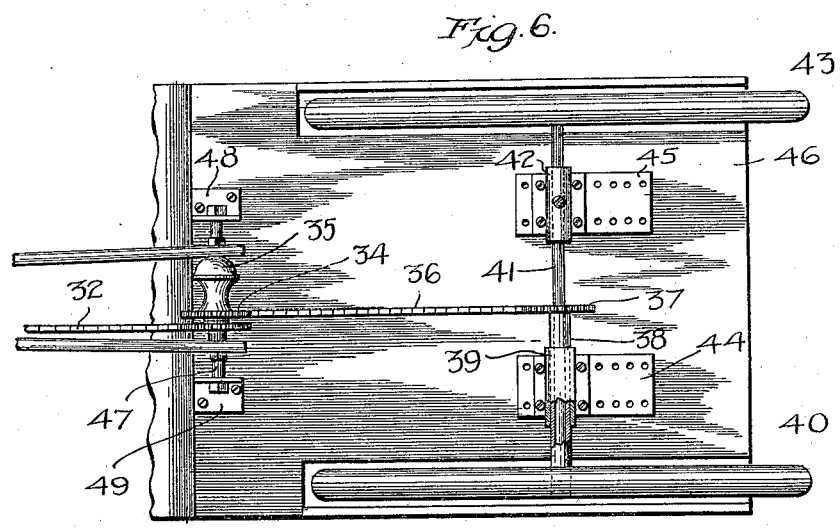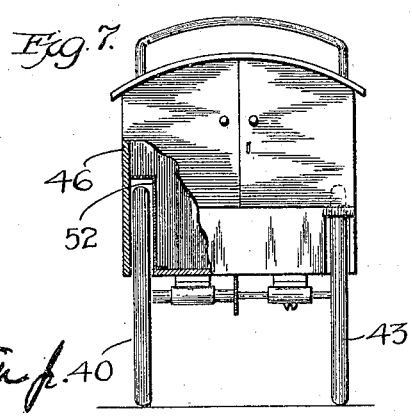

UNITED STATES PATENT OFFICE.

MORRIS WORKSMAN, OF NEW YORK, N. Y.

DELIVERY-VEHICLE.

1,146,296.  Specification of Letters Patent.  Patented July 13, 1915.

Application filed March 14, 1914. Serial No. 824,679.

*To all whom it may concern:*

Be it known that I, MORRIS WORKSMAN, a citizen of the United States, residing in the borough of Manhattan, city, county, and State of New York, have invented certain new and useful Improvements in Delivery-Vehicles, of which the following is a full and clear specification.

My invention relates to delivery vehicles and more especially to those in the form of bundle carrying bicycles or tricycles.

An important object of my invention is to provide an attachment which can be applied to ordinary bicycles or motor cycles to form a delivery vehicle. It has already been proposed to mount package carriers upon bicycles and the like, but according to my invention the bundle carrier portion is provided with one or more wheels and hence virtually forms part of the vehicle itself.

Two embodiments of the invention are illustrated by way of example in the accompanying drawing, in which—

Figure 1 is a side elevation of a bicycle provided with one form of my attachment; Fig. 2 is a rear elevation of the same; Fig. 3 is a detail transverse section through the bundle carrier, illustrating the support of the carrier at the rear axle of the bicycle; Fig. 4 is a detail vertical longitudinal section of the bundle carrier, illustrating the yielding attachment of the carrier to the bicycle frame; Fig. 5 is a side elevation of another embodiment of my invention in which the rear wheel of the bicycle is removed and the drive occurs through the bundle carrier wheels; Fig. 6 is an underneath plan view of the bundle carrier showing the drive transmission, and Fig. 7 is a rear elevation of the bundle carrier and its supporting and driving wheels, with parts broken away.

Referring more specifically to Figs. 1 to 4, inclusive, 1 and 2 indicate the front and rear wheels of a bicycle mounted in a frame 3 and driven by chain 4.

5 indicates the bundle carrier which is preferably provided with a rounded overhanging top 6 and railing 7. The bundle carrier 5 is slotted longitudinally in its forward lower portion to accommodate the rear wheel 2 of the bicycle, the slot being covered by a casing 8 to inclose the portion of the wheel extending into the interior of the bundle carrier. The bundle carrier is provided with suitable brackets 9 from which are hung the bent, curved or offset forks 10 for auxiliary wheels 11.

It will be observed that with the arrangement thus far described, the vehicle as a whole has three transverse lines of engagement with the road bed namely, the wheels 1, 2 and 11. In view of this condition it is essential that one of these transverse lines be capable of moving out of the longitudinal line of the other two so as to accommodate irregularities or deviations of the road bed from a single plane. To satisfy this requirement I prefer to have the bundle carrier so mounted with respect to the bicycle as to permit relative movement between the two. Figs. 3 and 4 illustrate one construction by which this relative movement is provided for. Referring to Fig. 3 the rear wheel 2 of the bicycle is shown as having its axle 12 extended by a threaded sleeve 13 into the outer threaded end of which is screwed a bolt 14. The bottom of carrier 5 has secured to it brackets 15 which are perforated to receive the bolt 14, and the bolt 14 passes through the perforated portion of the bracket 15 and a washer 16, whereby the box is pivotally secured to the extension 13 of the rear wheel axle 12.

To further support and steady the bundle carrier 5, I provide a resilient thrust support by which the upper portion of the bundle carrier is secured to the rear portion of the bicycle frame, as illustrated in Fig. 4. Referring to Fig. 4 it will be seen that the rear fork of the bicycle frame has secured to it a clamp 17 which is provided with a socket 18 to receive a sleeve 19. The bottom of sleeve 19 is split and formed with wedging surfaces which are engaged by a rod 20 to spread the split end of the sleeve and firmly secure it within the socket 18. A post 21 has its upper end fixedly and adjustably secured in a bracket 22 by a set bolt 23 which is threaded into the tapped end of the post 21. The lower end of the post 21 is provided with a longitudinal bore. The post 21 is slidably positioned in the sleeve 19, with a cushioning spring 24 disposed within its longitudinal bore and engaging the end wall of the bore and a disk 25, which is secured on the lower end of the rod 20. By this construction the bundle carrier or box 5 is adapted to pivot on the rear wheel axis and is given additional support and further steadied by the cushioning support or attachment.

Referring to the embodiment shown in Figs. 5, 6 and 7, of the drawing, I have herein illustrated a construction in which the rear wheel of the bicycle is removed and the drive is effected through a drive wheel mounted on the bundle carrier or box. In this embodiment 30 indicates the front wheel and 31 the frame of a bicycle which is driven by chain 32. The rear axle of the bicycle proper remains in the rear fork and is utilized as one of the means of securing the bundle carrier to the bicycle, in addition to its function as a sprocket wheel axis. Chain 32 operates a rear sprocket 33, the connection preferably being provided with any approved coaster brake device 35. The sprocket 34 operates on chain 36 which engages a sprocket wheel 37, which is fixed on sleeve shaft 38. Sleeve shaft 38 is mounted in an adjustable bracket or bearing 39 and has fixed thereon a drive wheel 40. An inner shaft 41 is mounted in an adjustable bracket or bearing 42 and has fixed thereon an idle wheel 43. The shaft 41 is freely disposed within the sleeve shaft 38. The brackets or bearings 39, 42 are adjustable by fixing them in different positions upon the plates 44 and 45, which are suitably secured to the bottom of the bundle carrier or box 46. By adjusting the positions of the bearing brackets 39, 42 the proper tension on chain 36 can be provided. The rear axle 47 of the bicycle, which has mounted thereon the sprocket wheels 33, 34 and the coaster brake mechanism 35 is secured to the box in brackets 48, 49. It will be seen that the rear axle 47 is mounted directly in the rear fork of the bicycle frame and the forward end of the box is constructed at an angle to the horizontal top and bottom so as to conform with the plane of the rear fork or frame of the bicycle. The box is further secured to the bicycle frame by a clamp plate 50 (see Fig. 5) having a bolt 51 which passes through the clamp plate and through the front board of the box 36. As shown in Fig. 7, the rear wheels 40, 43 may be housed within the box 46 in side compartments formed by the partition walls 52.

It will be apparent that by the construction shown and described involving the conformation of the box with the rear frame of the bicycle and the securing of the box (through axles 47) directly to the bottom of the bicycle frame and by clamp 50 directly to the upper portion of the bicycle frame, a structure of great strength and rigidity is obtained while at the same time the expense of special parts is minimized and the bundle carrier is rendered directly attachable to the ordinary bicycle frame with great simplicity.

While I have selected these two embodiments of my invention to illustrate the principles involved, it will be apparent the invention is applicable to, and hence includes, within this broad scope, the use of the bundle carrying attachment in conjunction with tricycles, motor cycles or any similar type of vehicle and is not necessarily limited to the attachment of the device to the rear, but it may be mounted in the front. The term "bicycle" is employed herein to include these various forms of manually propelled vehicles.

I claim:

1. A delivery vehicle comprising in combination a bicycle, a detachable bundle carrier shaped to conform with the rear frame of the bicycle, supporting wheels mounted thereon, and means for securing said bundle carrier against the rear frame of the bicycle.

2. A delivery vehicle comprising in combination a bicycle, a detachable bundle carrier shaped to conform with the rear frame of the bicycle, supporting wheels mounted thereon, and means for securing said bundle carrier above and below, against the rear frame of the bicycle.

3. A delivery vehicle comprising in combination a bicycle, a detachable bundle carrier shaped to conform with the rear frame of the bicycle, supporting wheels mounted thereon, means for securing said bundle carrier at one point to the rear axle of the bicycle and means for securing said bundle carrier at another point to the rear frame of the bicycle above said axle.

4. A delivery vehicle comprising in combination a bicycle, a detachable bundle carrier having supporting wheels, driving gear connected therewith and with the rear sprocket of the bicycle proper, means for securing said bundle carrier at one point to the rear axle of the bicycle and means for securing said bundle carrier at another point to the upper portion of the rear frame of the bicycle.

MORRIS WORKSMAN.

Witnesses:
 Wm. A. Courtland,
 Octavius Knight.

Copies of this patent may be obtained for five cents each, by addressing the "Commissioner of Patents, Washington, D. C."